US012676514B2

(12) United States Patent
Horiuchi

(10) Patent No.: US 12,676,514 B2
(45) Date of Patent: Jul. 7, 2026

(54) STATOR, MOTOR, AND GENERATOR

(71) Applicant: SANYO DENKI CO., LTD., Tokyo (JP)

(72) Inventor: Manabu Horiuchi, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 211 days.

(21) Appl. No.: 18/598,465

(22) Filed: Mar. 7, 2024

(65) Prior Publication Data

US 2024/0333048 A1 Oct. 3, 2024

(30) Foreign Application Priority Data

Mar. 29, 2023 (JP) ................................. 2023-053648

(51) Int. Cl.
*H02K 1/14* (2006.01)
*H02K 1/02* (2006.01)
(52) U.S. Cl.
CPC ............... *H02K 1/148* (2013.01); *H02K 1/02* (2013.01); *H02K 2213/03* (2013.01)
(58) Field of Classification Search
CPC ....... H02K 1/148; H02K 1/02; H02K 2213/03
See application file for complete search history.

(56) References Cited

U.S. PATENT DOCUMENTS

| | | | |
|---|---|---|---|
| 5,909,072 A | 6/1999 | Muller | |
| 7,845,065 B2 | 12/2010 | Holmes | |
| 2009/0113696 A1* | 5/2009 | Holmes | H02K 1/02 |
| | | | 29/596 |
| 2020/0161944 A1 | 5/2020 | Das et al. | |

FOREIGN PATENT DOCUMENTS

| | | | |
|---|---|---|---|
| CN | 114498969 A | 5/2022 | |
| DE | 102017222055 A1 * | 6/2019 | ............. H02K 15/10 |
| JP | S5297102 A | 8/1977 | |
| JP | H0556614 A | 3/1993 | |
| JP | 2008278672 A * | 11/2008 | |
| JP | 2009253996 A | 10/2009 | |

OTHER PUBLICATIONS

English translation of JP 2008-278672 A. (Year: 2008).*
English translation of DE 10 2017 222 055 A1 (Year: 2019).*
Extended European Search Report (EESR) issued on Sep. 6, 2024 for European Patent Application No. 24165103.3.

* cited by examiner

*Primary Examiner* — Sean Gugger
(74) *Attorney, Agent, or Firm* — RANKIN, HILL & CLARK LLP

(57) ABSTRACT

A stator is provided which includes two or more kinds of soft magnetic materials having different magnetic properties. Moreover, a stator is provided which further includes a plurality of pole portions, in which at least one of the plurality of pole portions includes a soft magnetic material different from the other pole portion, and a motor and a generator are provided which include any of the stators, and a rotor.

10 Claims, 12 Drawing Sheets

STATOR, MOTOR, AND GENERATOR

CROSS-REFERENCE TO RELATED APPLICATION

This application is based on Japanese Patent Application No. 2023-053648 filed with the Japan Patent Office on Mar. 29, 2023, the entire content of which is hereby incorporated by reference.

BACKGROUND

1. Technical Field

The present disclosure relates to a stator, a motor, and a generator.

2. Related Art

Torque ripple in a motor causes various problems such as deterioration of control performance, an increase in vibration, and an increase in noise. Hence, some means for suppressing the torque ripple in a motor have been proposed. For example, JP-A-52-097102 discloses a stator in a motor, the stator including a slit provided in the center of each pole portion between phase winding slots to reduce the torque ripple. Moreover, JP-A-05-056614 discloses a stator in a motor, the stator including pole portions between phase winding slots that have bowed distal ends to reduce the torque ripple.

However, in the stators disclosed in JP-A-52-097102 and JP-A-05-056614, air gaps through which magnetic flux passes are increased. Hence, torque in a motor may decrease. Therefore, a technology is required which reduces torque ripple while suppressing a decrease in torque in a motor.

An object of the present disclosure is to provide a stator, motor, and generator that can reduce torque ripple while suppressing a decrease in torque.

SUMMARY

A stator according to the embodiment includes two or more kinds of soft magnetic materials having different magnetic properties. Moreover, a stator according to the embodiment further includes a plurality of pole portions, in which at least one of the plurality of pole portions includes a soft magnetic material different from the other pole portion. Furthermore, a motor and a generator according to the embodiment include any of the stators, and a rotor.

DETAILED DESCRIPTION

Figure 1:
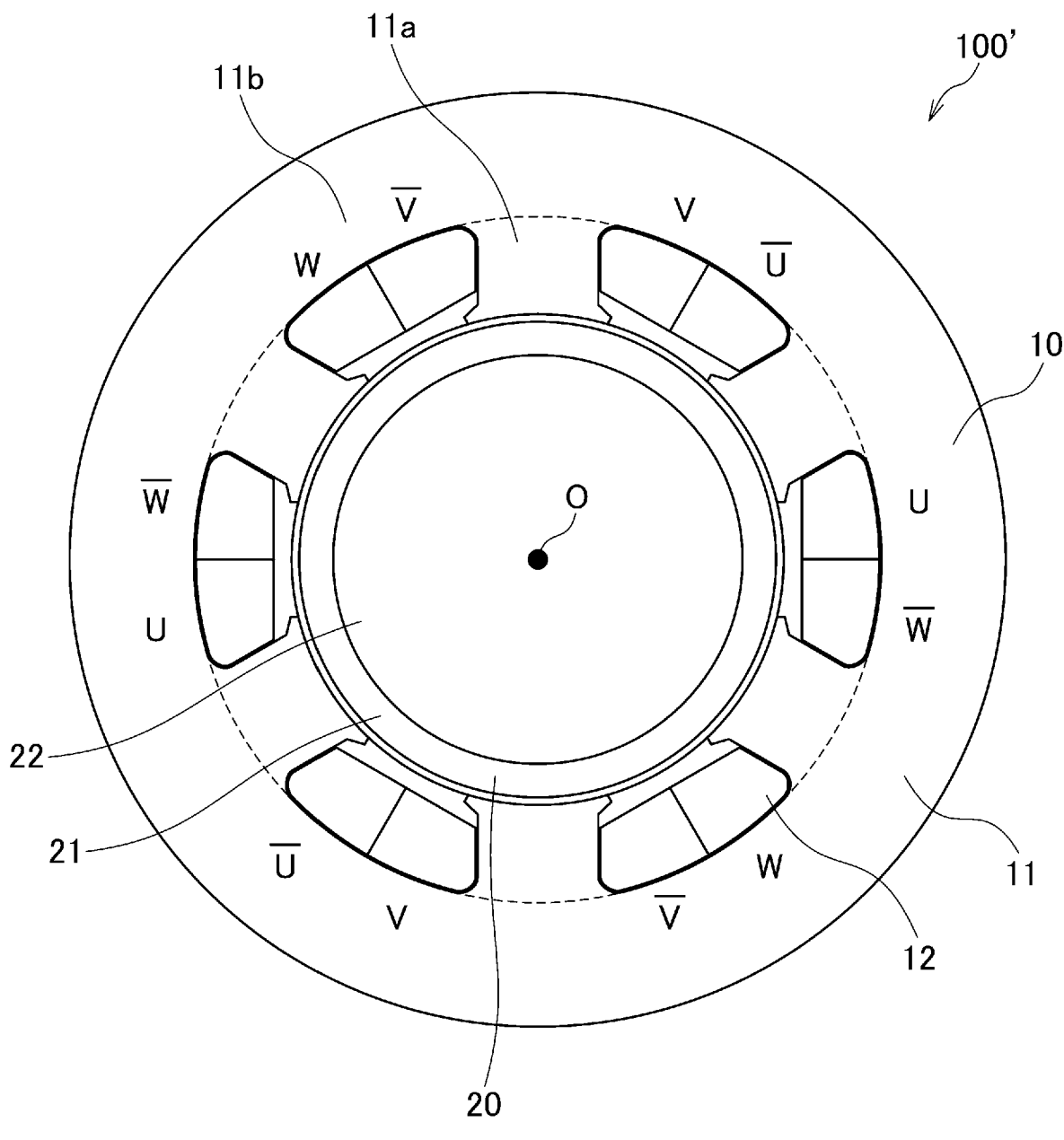
FIG. 1 is a horizontal cross-sectional view of a motor of a first comparative example.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A stator according to one aspect of the embodiment includes two or more kinds of soft magnetic materials having different magnetic properties.

A motor and a generator according to one aspect of the embodiment include the stator and a rotor.

According to the embodiment, it is possible to suppress a decrease in torque in the motor and at the same time reduce its torque ripple.

The embodiment is described hereinafter with reference to the drawings. Note that the descriptions of members having the same reference numerals as those of members that have already been described are omitted in the detailed description for convenience of description. Moreover, the dimensions of each member illustrated in the drawings may be different from actual dimensions thereof for convenience of description.

First Embodiment

A motor 100' of a first comparative example is described for comparison with reference to FIG. 1 to describe the details of a motor 100 according to a first embodiment.

FIG. 1 is a horizontal cross-sectional view of the motor 100' of the first comparative example. The motor 100' illustrated in FIG. 1 has an interior permanent magnet synchronous motor (IPMSM) structure with the number of slots per pole per phase q=0.5, the structure having four poles, six slots, and three phases, and concentrated winding. Note that let the number of slots be N, let the number of phases be m, and the number of poles be P, and let the number of slots per pole per phase q is a value obtained by an equation q=N/(m·P). In the example illustrated in FIG. 1, the value of q is equal to or less than one.

The motor 100' includes a stator 10 and a rotor 20. The rotor 20 is rotatable relative to the stator 10.

The stator 10 includes a ring-shaped stator core 11. The stator core 11 is formed of a plurality of electromagnetic steel plates laminated in a rotation axis direction (a direction perpendicular to the page of FIG. 1). Moreover, the stator core 11 includes a single soft magnetic material. Furthermore, the stator core 11 includes six pole portions (teeth) 11a having an approximately T shape in plan view, on a radially inner side, and a yoke portion 11b on a radially outer side.

The six pole portions 11*a* have substantially the same shape, and are supported by the yoke portion 11*b*. Slots are provided each between two adjacent pole portions 11*a*. Stator coils 12 are installed in the slots. The stator coils 12 are wound around the pole portions 11*a*, respectively, in a concentrated winding form. Alternating current is applied from the outside to the stator coils 12. The phases of currents passing through two sections, which are separated by the corresponding pole portion 11*a*, of each of the stator coils 12 are opposite to each other. For example, when an inverted phase U current passes through a section 12*a* of the stator coil 12, a phase U current passes through a section 12*b* separated from the section 12*a* by the corresponding pole portion 11*a*.

The rotor 20 includes a rotor core 21. The rotor core 21 is formed of a plurality of electromagnetic steel plates laminated in the rotation axis direction. Moreover, the rotor core 21 has a cylindrical shape. An inner peripheral surface of the rotor core 21 delimits a shaft mounting hole 22. An unillustrated drive shaft is fixed in the shaft mounting hole 22. The drive shaft is supported by an unillustrated housing in such a manner as to be rotatable about a rotation center O.

The rotor core 21 of the rotor 20 includes a plurality of unillustrated rotor magnets. The rotor magnets are formed of permanent magnets embedded in slots. Each of the rotor magnets forms one pole with a different polarity.

The motor 100 of the first embodiment is described in detail below with reference to FIGS. 2 to 4.

Figure 2:
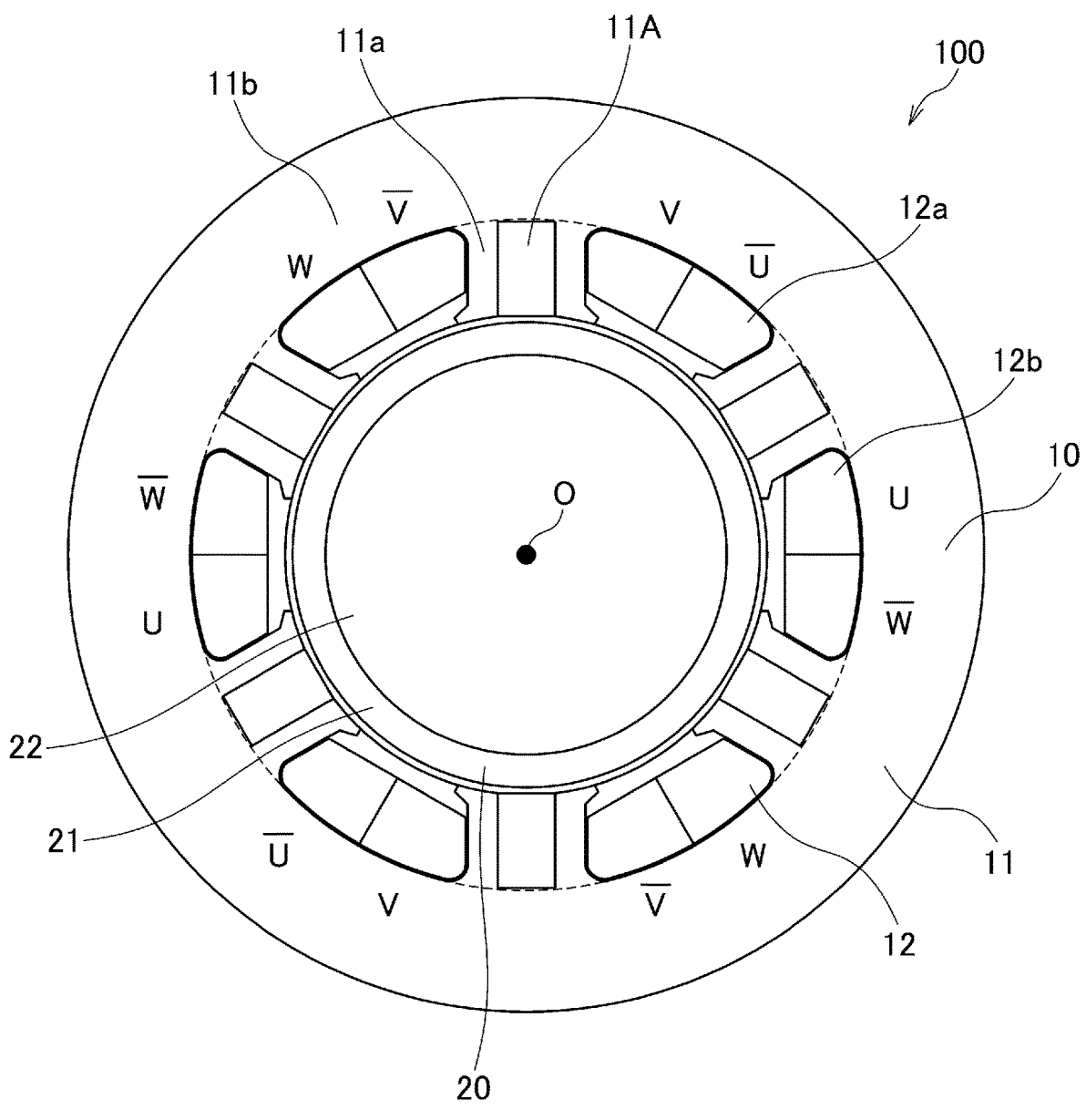
FIG. 2 is a horizontal cross-sectional view of a motor according to a first embodiment.

FIG. 2 is a horizontal cross-sectional view of the motor 100 according to the first embodiment. Only differences from the configuration of the motor 100' of the first comparative example illustrated in FIG. 1 are described below.

The stator core 11 includes two or more kinds of soft magnetic materials having different magnetic properties. Specifically, at least a part (a second soft magnetic material 11A in the exemplification of FIG. 2) of a section from each of the pole portions 11*a* to the yoke portion 11*b* includes a soft magnetic material different from the other section (a first soft magnetic material). For example, an electromagnetic steel plate is used as the first soft magnetic material. For example, a Ni—Fe alloy (permalloy) is used as the second soft magnetic material 11A. In this manner, the first soft magnetic material and the second soft magnetic material 11A are soft magnetic materials different from each other. Hence, the relative permeabilities of these soft magnetic materials are also different from each other.

The stator core 11 includes the two or more kinds of soft magnetic materials having the different magnetic properties. Therefore, torque ripple caused in the motor 100 reduces. The reason for it is described with reference to FIG. 3.

Figure 3:
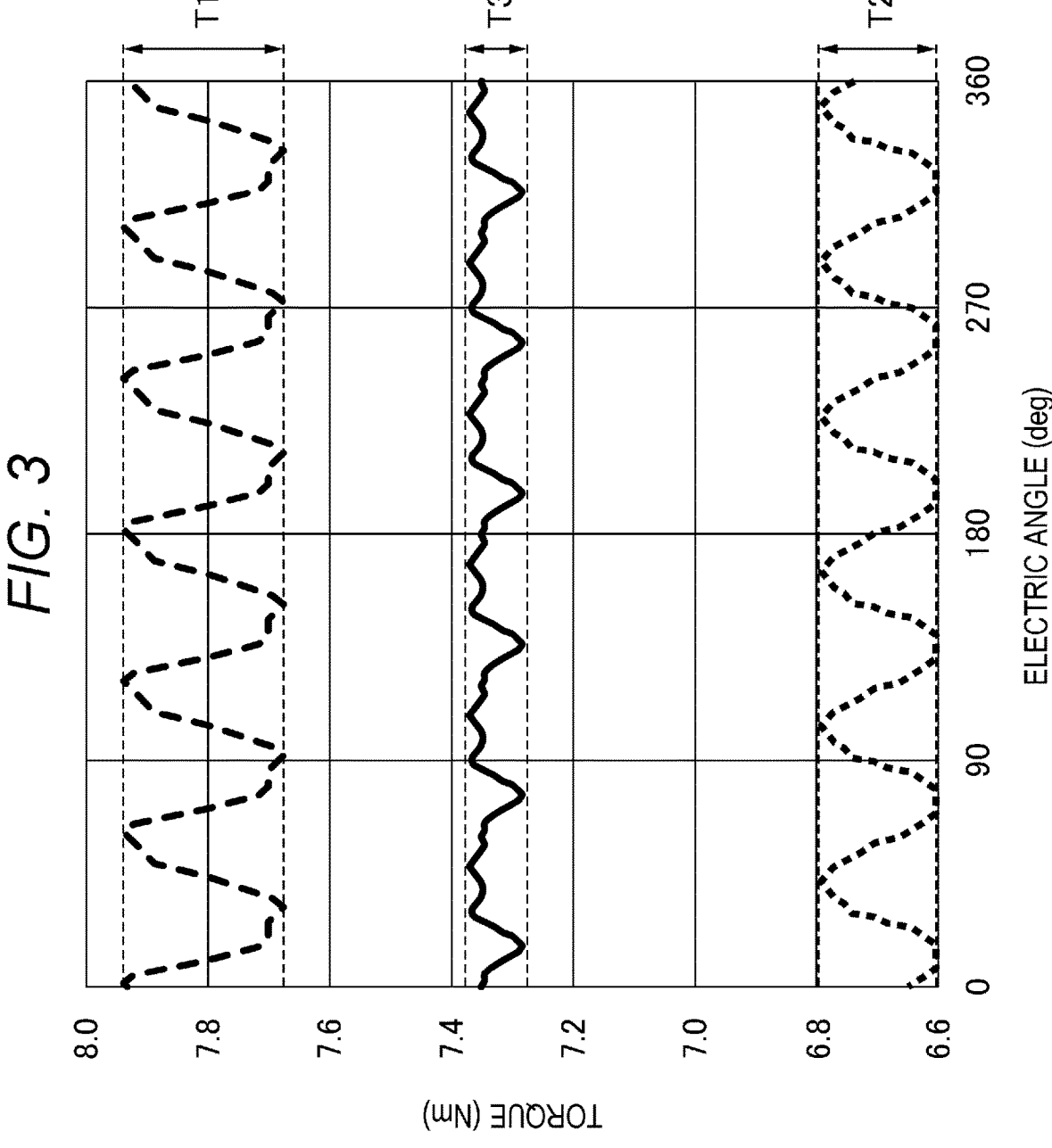
FIG. 3 is a graph illustrating torque characteristics of the motor of the first comparative example, a motor according to a reference example, and the motor according to the first embodiment.

FIG. 3 is a graph illustrating torque characteristics of the motor of the first comparative example illustrated in FIG. 1, a motor of a reference example, and the motor according to the first embodiment illustrated in FIG. 2. In the configuration of the motor of the reference example, the second soft magnetic material 11A sections of the motor 100 according to the first embodiment illustrated in FIG. 2 are replaced with air gaps. The air gaps contain air.

In FIG. 3, the horizontal axis indicates the electric angle. The vertical axis indicates torque. A broken-line waveform indicates torque in the motor 100' of the first comparative example. A dotted-line waveform indicates torque in the motor of the reference example. A solid-line waveform indicates torque in the motor 100 according to the first embodiment. In FIG. 3, a reference numeral T1 indicates the magnitude of torque ripple of the torque waveform of the motor 100' of the first comparative example. A reference numeral T2 indicates the magnitude of torque ripple of the torque waveform of the motor of the reference example. A reference numeral T3 indicates the magnitude of torque ripple of the torque waveform of the motor 100 according to the first embodiment.

As illustrated in FIG. 3, the magnitude T2 of the torque ripple in the motor of the reference example is reduced to approximately ¾ of the magnitude T1 of the torque ripple in the motor 100' of the first comparative example. However, the magnitude of the torque in the motor of the reference example is reduced by approximately 1.1 Nm from the magnitude of the torque in the motor 100' as the first comparative example.

On the other hand, the magnitude T3 of the torque ripple in the motor 100 according to the first embodiment is reduced to approximately ⅓ of the magnitude T1 of the torque ripple in the motor 100' of the first comparative example. Furthermore, the magnitude of the torque in the motor 100 according to the first embodiment is reduced only by approximately 0.45 Nm from the magnitude of the torque in the motor of the first comparative example. In other words, the configuration of the first embodiment allows reducing torque ripple while suppressing a decrease in torque in the motor.

Figure 4:
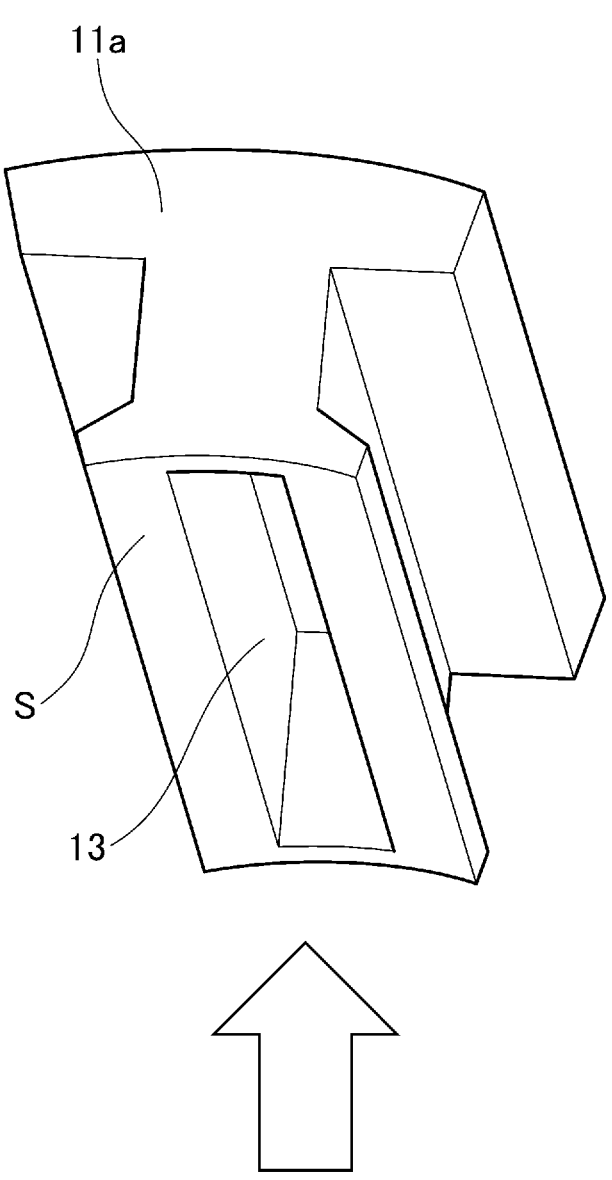
FIG. 4 is a schematic diagram of a pole portion of a stator according to the first embodiment.

FIG. 4 is a schematic diagram of the pole portion of the motor according to the first embodiment. As illustrated in FIG. 4, the pole portion 11*a* includes the first soft magnetic material. Moreover, the pole portion 11*a* includes an insertion hole 13 of a protruding shape that projects from a part of an inner peripheral surface S on the radially inner side toward the radially outer side. The second soft magnetic material 11A is inserted into the insertion hole 13 along an arrow direction of FIG. 4 and installed therein. In this manner, the pole portion 11*a* includes the plurality of magnetic materials: the first soft magnetic material; and the second soft magnetic material 11A. Such a shape allows the pole portion 11*a* including the two or more kinds of soft magnetic materials having the different magnetic properties to be easily assembled.

Second Embodiment

Figure 5:
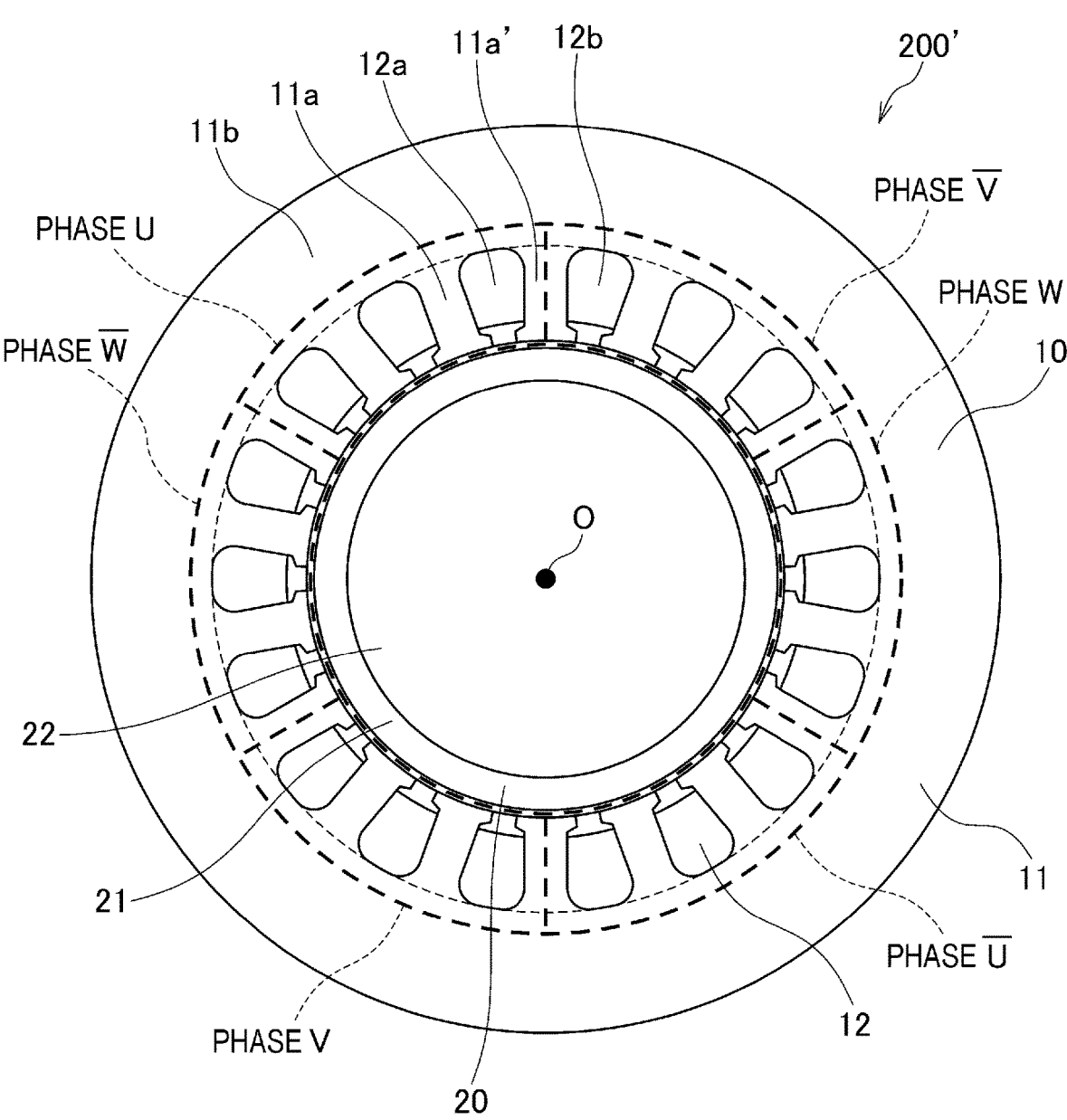
FIG. 5 is a horizontal cross-sectional view of a motor of a second comparative example.

A motor 200' of a second comparative example is described for comparison with reference to FIG. 5 to describe the details of a motor 200 according to a second embodiment.

FIG. 5 is a horizontal cross-sectional view of the motor 200' of the second comparative example. The motor 200' illustrated in FIG. 5 has an interior permanent magnet synchronous motor (IPMSM) structure with the number of slots per pole per phase q=3, the structure having two poles, 18 slots, and three phases, and distributed winding. In the example illustrated in FIG. 5, the value of q is greater than one.

The motor 200' includes a stator 10 and a rotor 20 that is is rotatable relative to the stator 10.

The stator 10 includes a ring-shaped stator core 11. The stator core 11 is formed of a plurality of electromagnetic steel plates laminated in a rotation axis direction. Moreover, the stator core 11 includes a single soft magnetic material. Furthermore, the stator core 11 includes a total of 18 first pole portions 11*a* and second pole portions 11*a'*, which have an approximately T shape in plan view, on a radially inner side, and a yoke portion 11*b* on a radially outer side. The total of 18 first pole portions 11*a* and second pole portions 11*a'* have substantially the same shape, and are supported by the yoke portion 11*b*. Slots are each provided between two adjacent first pole portions 11a or between the first pole portion 11a and the second pole portion 11a that are adjacent to each other. Stator coils 12 are installed in the slots. The stator coils 12 are placed in a ring form. The stator coils 12 are wound around in a distributed winding form and are configured in such a manner as to allow alternating current to be applied from the outside. The phases of currents passing through two sections, which are separated by the corresponding first pole portion 11a, of each of the stator coils 12 are the same. The phases of currents passing through two sections, which are separated by the corresponding second pole portion 11a', of each of the stator coils 12 are opposite to each other. For example, when a phase U current passes through a section 12a of the stator coil 12, an inverted phase V current passes through a section 12b separated from the section 12a by the corresponding second pole portion 11a'.

Note that the configuration of the rotor 20 is the same as the configuration of the rotor 20 of the motor 100 of the first comparative example illustrated in FIG. 1. Hence, a description thereof is omitted.

The motor 200 of the second embodiment is described in detail below with reference to FIGS. 6 to 9.

Figure 6:
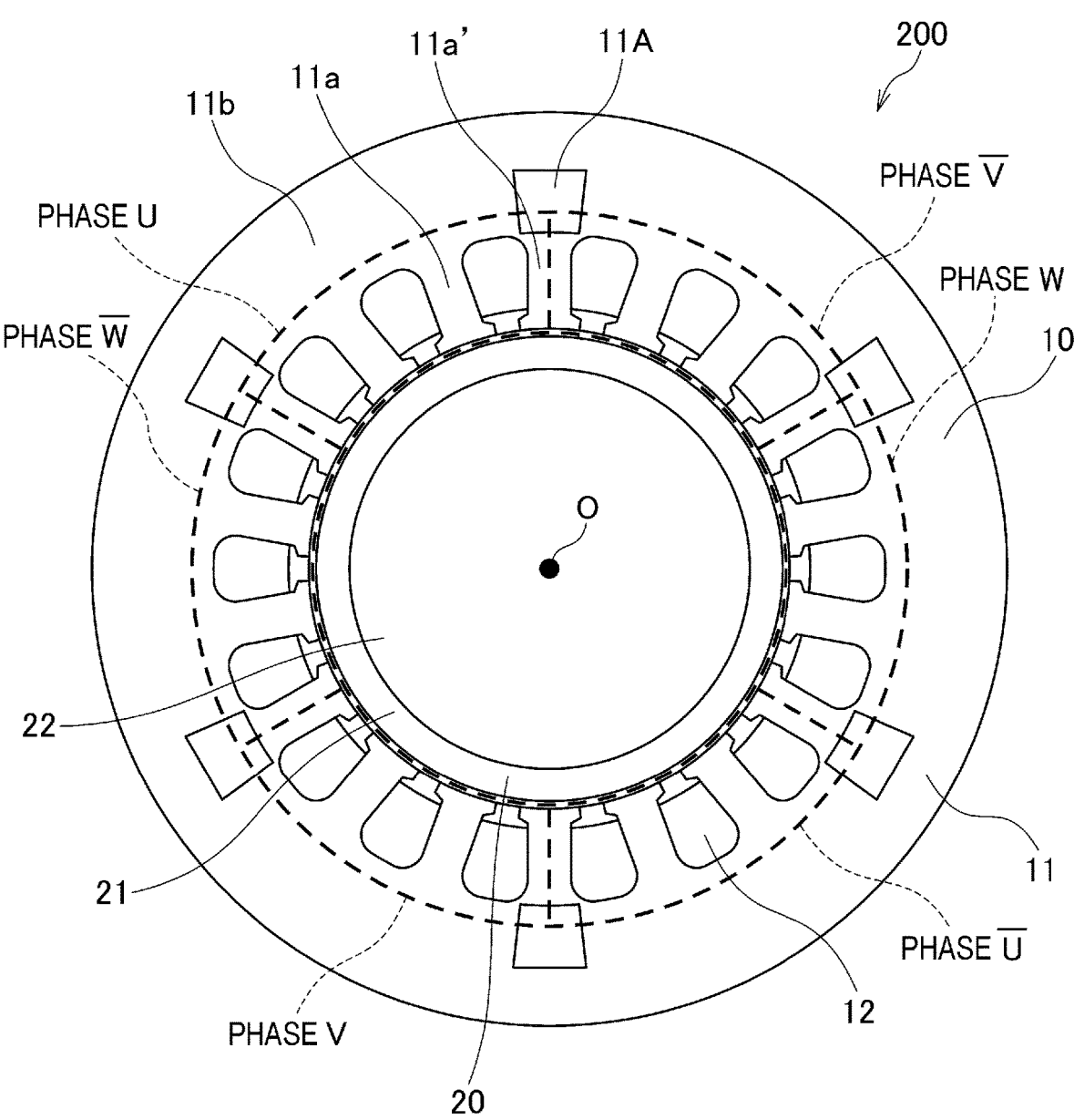
FIG. 6 is a horizontal cross-sectional view of a motor according to a second embodiment.

FIG. 6 is a horizontal cross-sectional view of the motor 200 according to the second embodiment. Only differences from the configuration of the motor 200' of the second comparative example illustrated in FIG. 5 are described below.

The stator core 11 includes two or more kinds of soft magnetic materials having different magnetic properties. Specifically, at least a part (a second soft magnetic material 11A in the exemplification of FIG. 6) of a section from each of the second pole portions 11a' to the yoke portion 11b includes a soft magnetic material different from the other section (a first soft magnetic material). For example, an electromagnetic steel plate is used as the first soft magnetic material. For example, a Ni—Fe alloy (permalloy) is used as the second soft magnetic material 11A. In this manner, the first soft magnetic material and the second soft magnetic material 11A are soft magnetic materials different from each other. Hence, the relative permeabilities of these soft magnetic materials are also different from each other.

Figure 7:
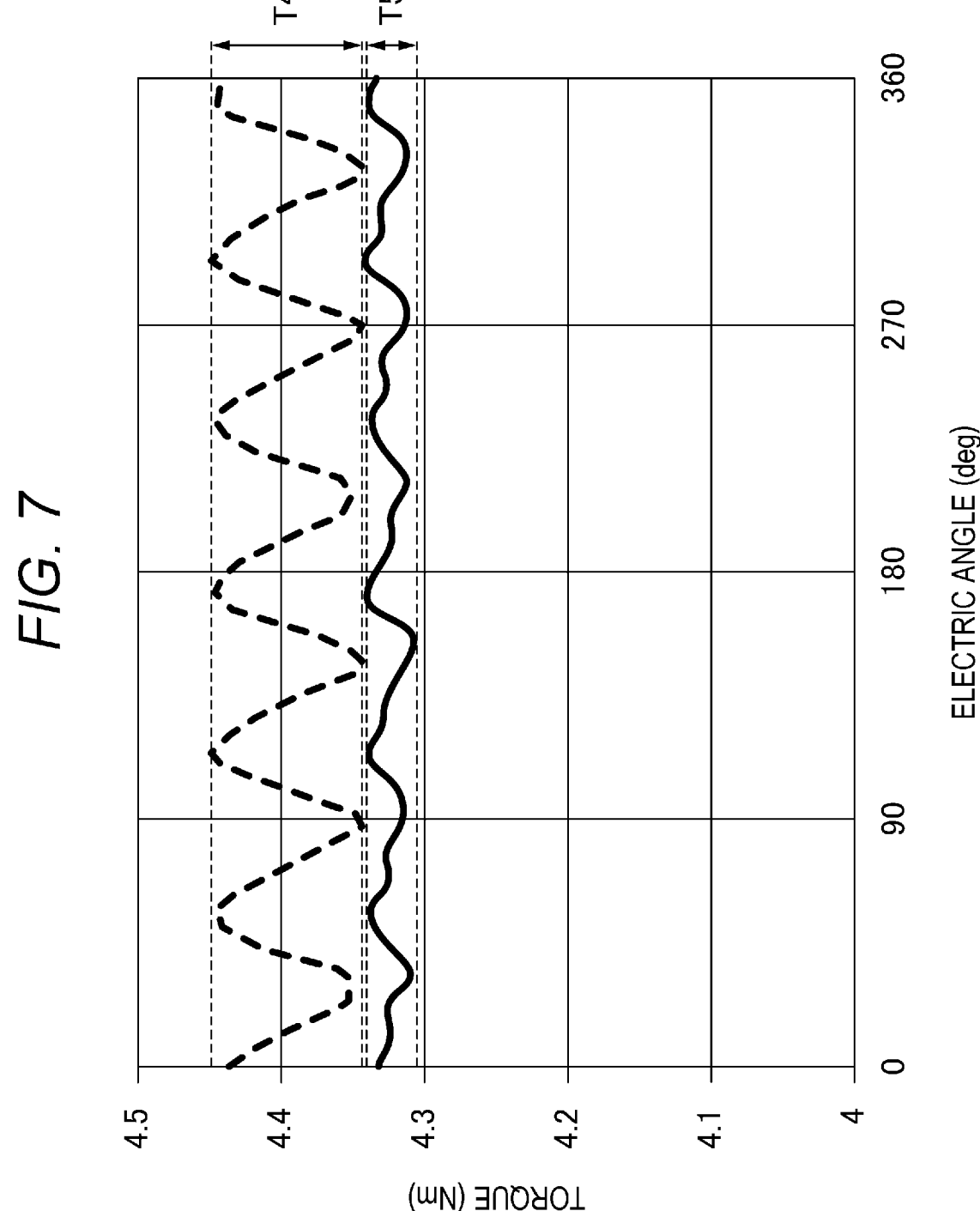
FIG. 7 is a graph illustrating torque characteristics of the motor of the second comparative example and the motor according to the second embodiment.

FIG. 7 is a graph illustrating torque characteristics of the motor of the second comparative example illustrated in FIG. 5 and the motor according to the second embodiment illustrated in FIG. 6. The horizontal axis indicates the electric angle. The vertical axis indicates torque. A broken-line waveform indicates torque in the motor 200' of the second comparative example. A solid-line waveform indicates torque in the motor 200 according to the second embodiment. In FIG. 7, a reference numeral T4 indicates the magnitude of torque ripple of the torque waveform of the motor 200' of the second comparative example. A reference numeral T5 indicates the magnitude of torque ripple of the torque waveform of the motor 200 according to the second embodiment.

As illustrated in FIG. 7, the magnitude T5 of the torque ripple in the motor 200 according to the second embodiment is reduced to approximately ⅓ of the magnitude T4 of the torque ripple in the motor 200' of the second comparative example. Furthermore, the magnitude of the torque in the motor 200 according to the second embodiment is reduced only by approximately 0.08 Nm from the magnitude of the torque in the motor of the second comparative example. In other words, the configuration of the second embodiment allows reducing torque ripple while suppressing a decrease in torque in the motor.

Figure 8:
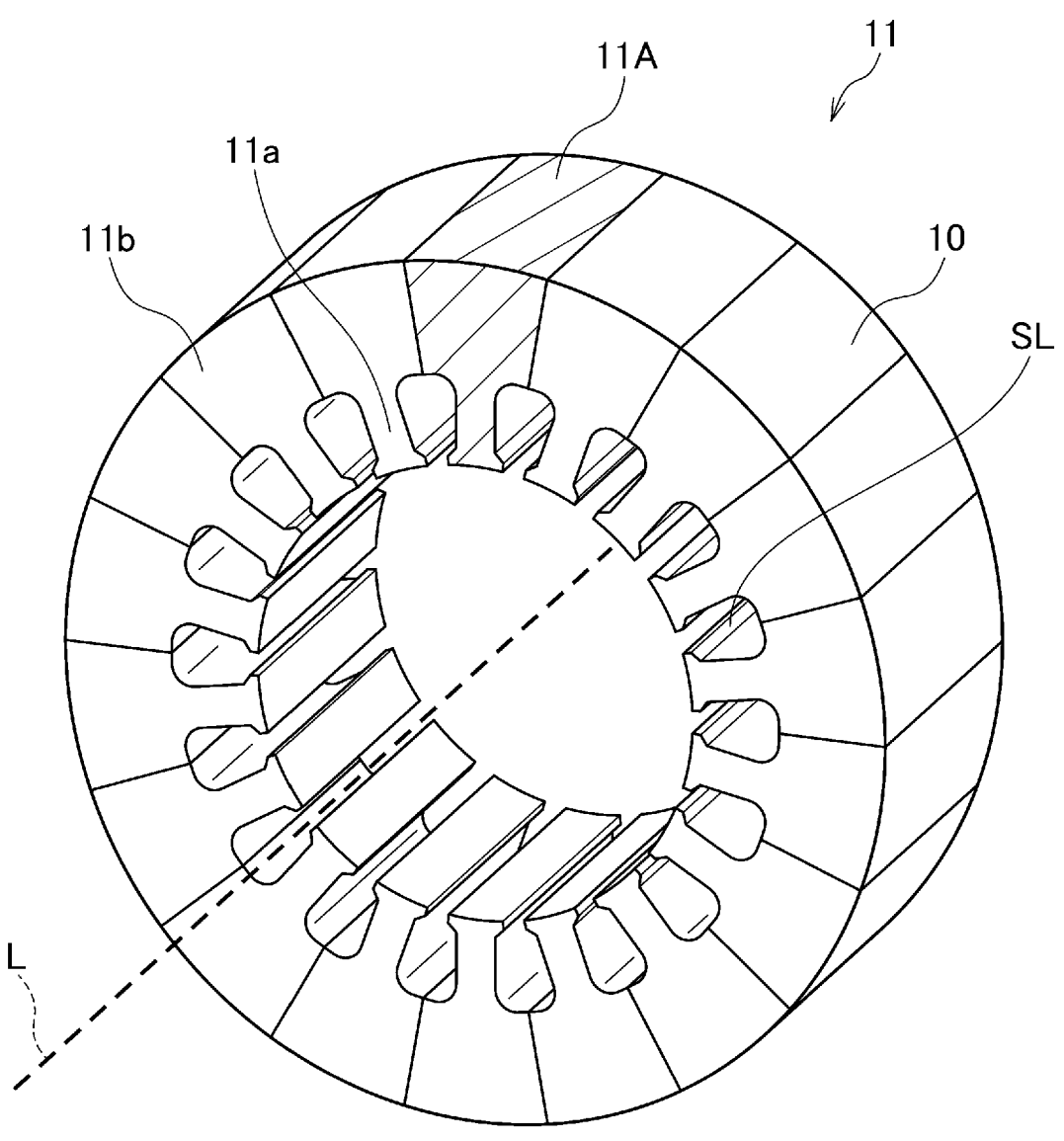
FIG. 8 is a schematic diagram of a stator core of a stator according to the second embodiment.
Figure 9:
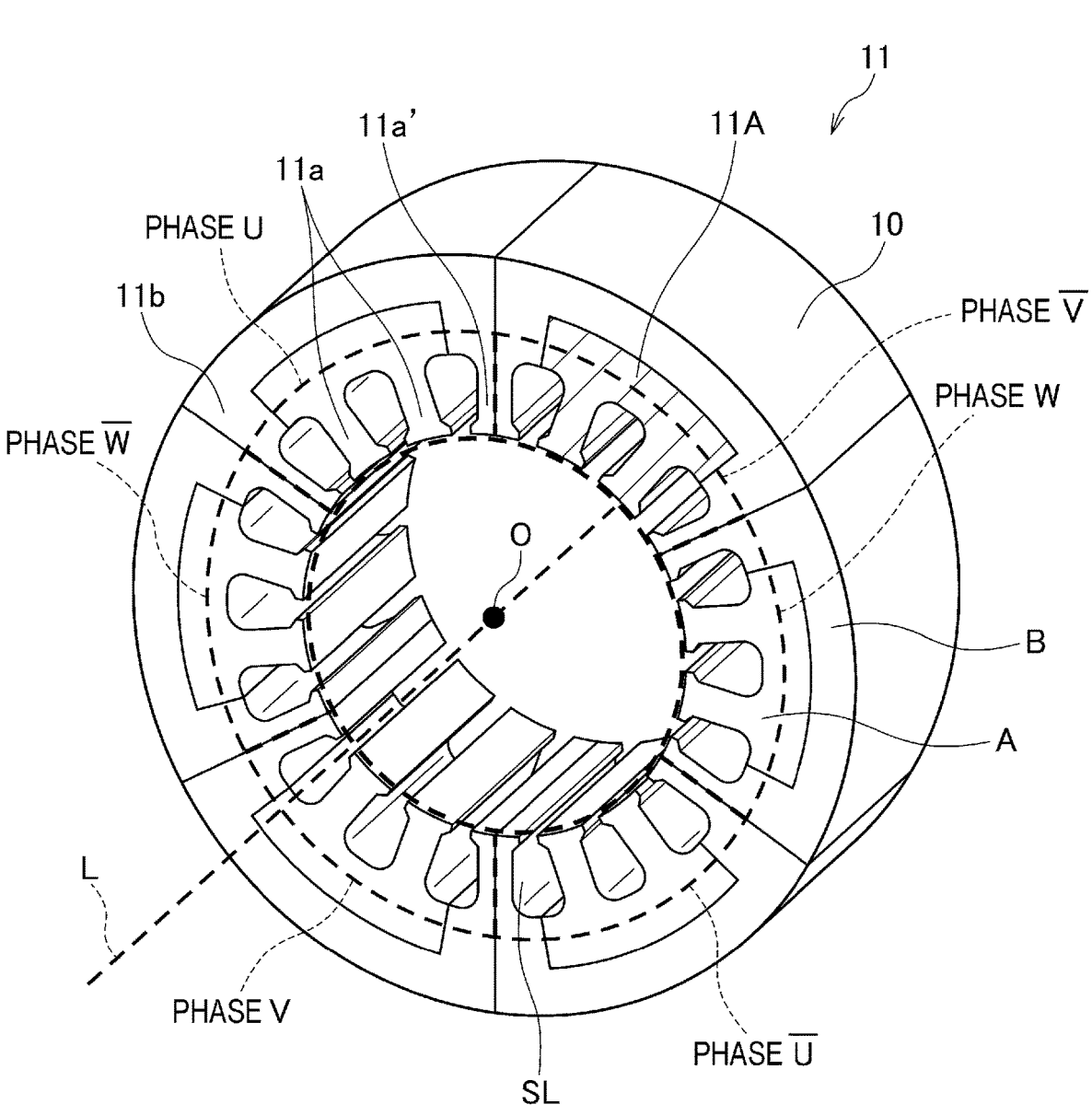
FIG. 9 is a schematic diagram of the stator core of the stator according to the second embodiment.
Figure 10:
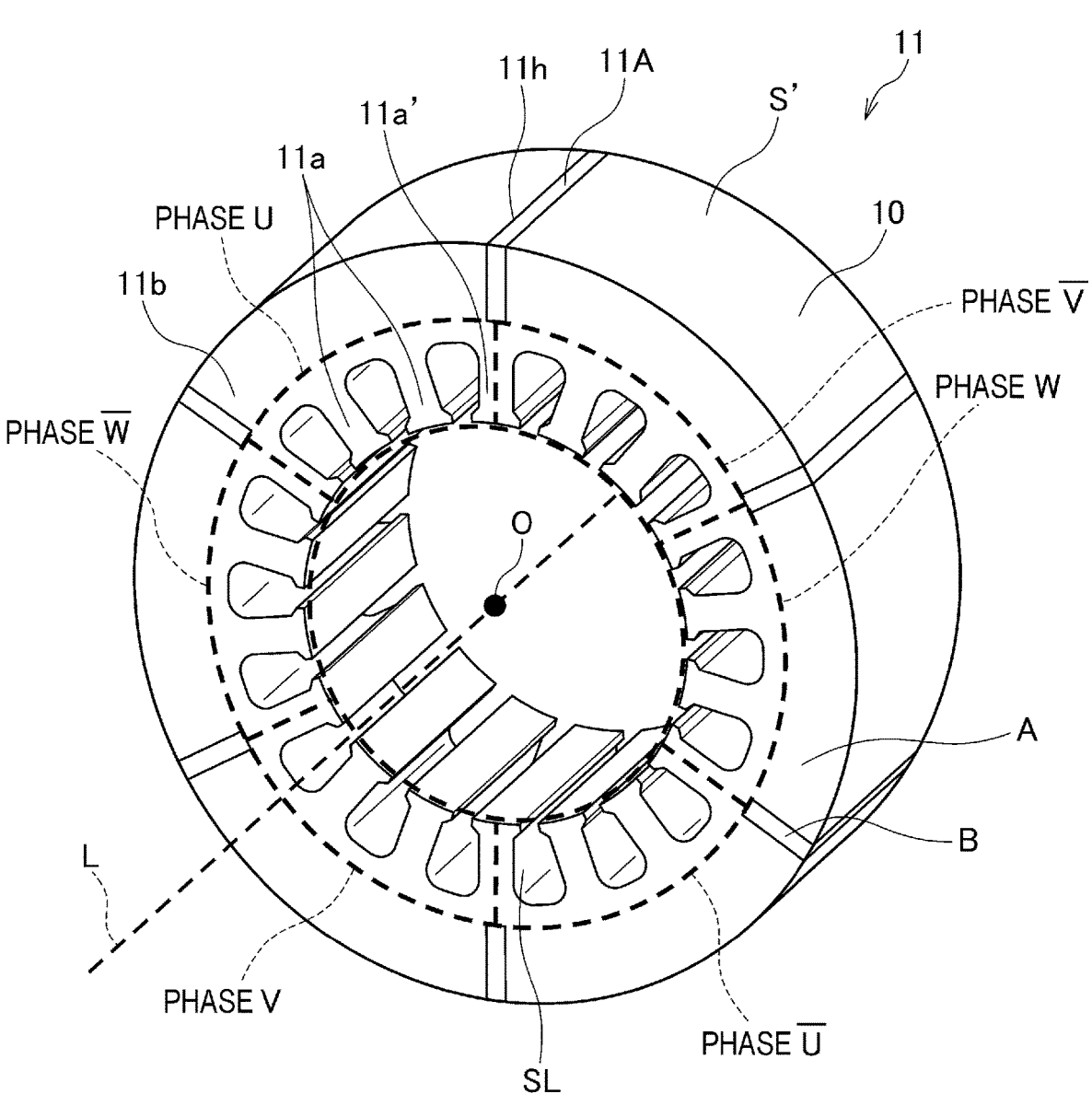
FIG. 10 is a schematic diagram of the stator core of the stator according to the second embodiment.

FIGS. 8 to 10 are schematic diagrams of the stator core of the stator according to the second embodiment.

The stator core 11 illustrated in FIG. 8 includes blocks divided in a circumferential direction in cross sections including a rotation axis L and passing through the centers of slots SL. The exemplified stator core 11 of FIG. 8 is evenly divided into 18 blocks in the circumferential direction. At least one (the second soft magnetic material 11A in the exemplification of FIG. 8) of the divided blocks includes a soft magnetic material different from the other blocks (the first soft magnetic material). In this manner, the stator 10 is divided into multiple blocks along the circumferential direction. Hence, it is easy to adjust the placement of the second soft magnetic material 11A.

The stator core 11 illustrated in FIG. 9 includes blocks divided in a circumferential direction in cross sections including the rotation axis L and passing through the centers of the pole portions 11a' each located between two slots SL having different phases from each other. In the exemplification of FIG. 9, the stator core 11 is evenly divided into six blocks in the circumferential direction. Furthermore, each of the six divided blocks includes an inner block A and an outer block B located outside the inner block A. Each of the inner blocks A couples a plurality of the pole portions 11a located between two slots SL having the same phase. At least one (the second soft magnetic material 11A in the exemplification of FIG. 9) of the plurality of inner blocks A and the plurality of outer blocks B includes a soft magnetic material different from the other blocks (the first soft magnetic material). In this manner, the stator core 11 is evenly divided in the circumferential direction between different phases. Hence, it is easy to change the magnetic material of a block of a desired phase.

The stator core 11 illustrated in FIG. 10 includes main blocks A and six insertion blocks B. The main blocks A include insertion grooves 11h of a recessed shape that is recessed from an outer peripheral surface S' on the radially outer side toward the radially inner side. The insertion blocks B are inserted into the insertion grooves 11h from the outer peripheral surface S' and installed therein. At least one (the second soft magnetic material 11A in the exemplification of FIG. 10) of the plurality of main blocks A and the plurality of insertion blocks B includes a soft magnetic material different from the other blocks (the first soft magnetic material). In this manner, the insertion blocks B are configured in such a manner as to be able to be inserted into the insertion grooves 11h from the outer peripheral surface S'. Therefore, it is easy to change the magnetic material of the stator core.

Modification of Second Embodiment

A modification of the motor according to the second embodiment is described in detail below with reference to FIGS. 11 and 12.

Figure 11:
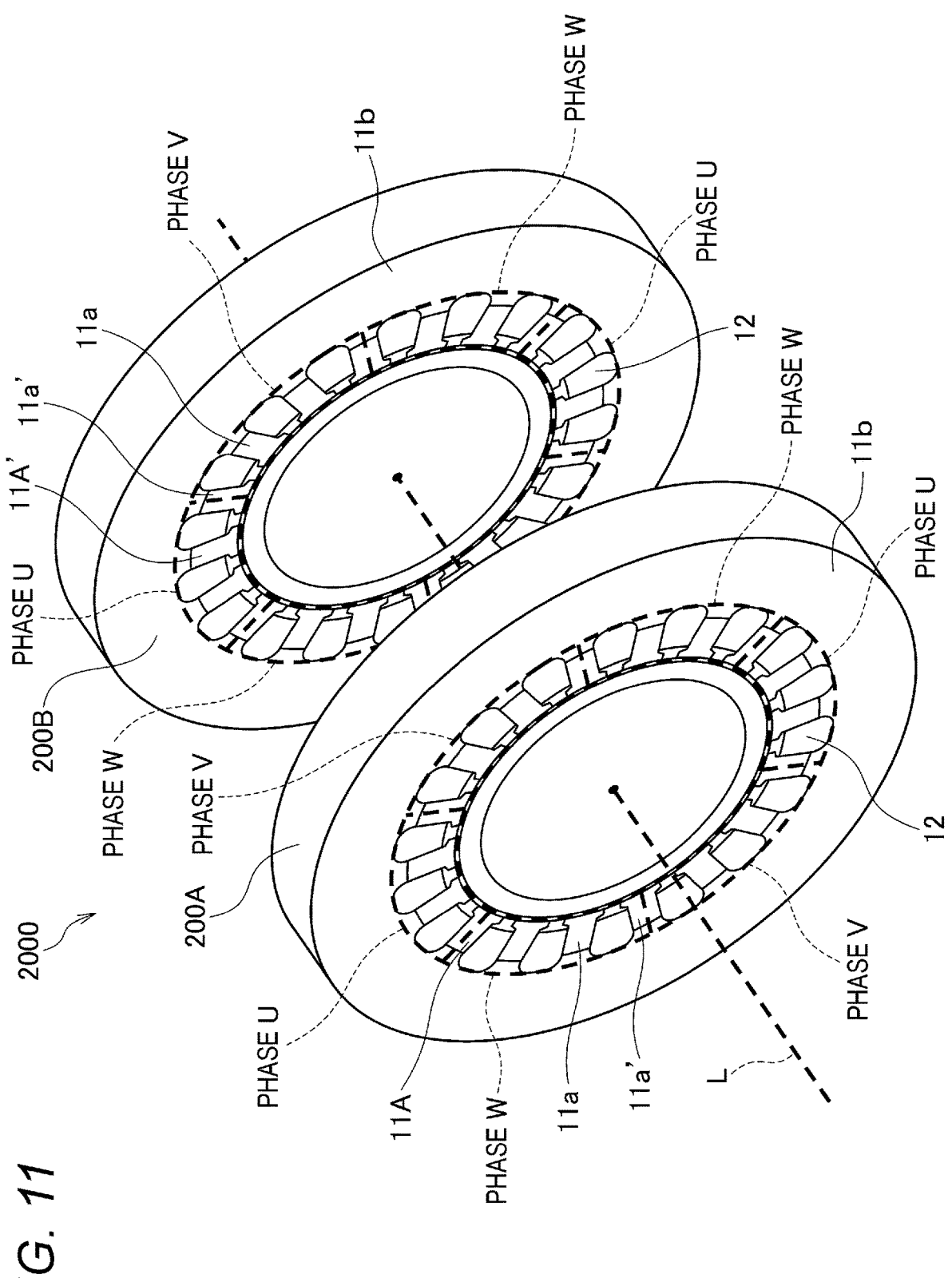
FIG. 11 is a schematic diagram illustrating a modification of the motor according to the second embodiment.

FIG. 11 is a schematic diagram illustrating the modification of the motor according to the second embodiment. A stator of a motor 2000 includes a first core sheet 200A and a second core sheet 200B. In the configuration of the stator, the first core sheet 200A and the second core sheet 200B are stacked in an axial direction of the rotation axis L. Each of the first core sheet 200A and the second core sheet 200B has an interior permanent magnet synchronous motor (IPMSM) structure with the number of slots per pole per phase q=3, the structure having two poles, 18 slots, and three phases, and distributed winding. Each of the first pole portions 11a is located between two stator coils 12 having the same phases (the phases U, the phases V, the phases W, the inverted phases U, the inverted phases V, or the inverted phases W). Each of the second pole portions 11a' is located between two stator coils 12 having different phases from each other.

Each of a stator core 11 of the first core sheet 200A and a stator core 11 of the second core sheet 200B includes two or more kinds of soft magnetic materials having different magnetic properties. Specifically, in the first core sheet 200A, at least a part (the second soft magnetic material 11A in the exemplification of FIG. 11) of a section from each of the second pole portions 11a' to the yoke portion 11b includes a soft magnetic material different from the other section (the first soft magnetic material). In the second core sheet 200B, at least a part (a second soft magnetic material 11A' in the exemplification of FIG. 11) of a section from each of the first pole portions 11a to the yoke portion 11b includes a soft magnetic material different from the other section (the first soft magnetic material).

The first core sheet 200A and the second core sheet 200B, which are adjacent in the axial direction of the rotation axis L, are placed in such a manner that the second soft magnetic material 11A of the first core sheet 200A do not overlap with the second soft magnetic material 11A' of the second core sheet 200B when observed perspectively in the axial direction.

Figure 12:
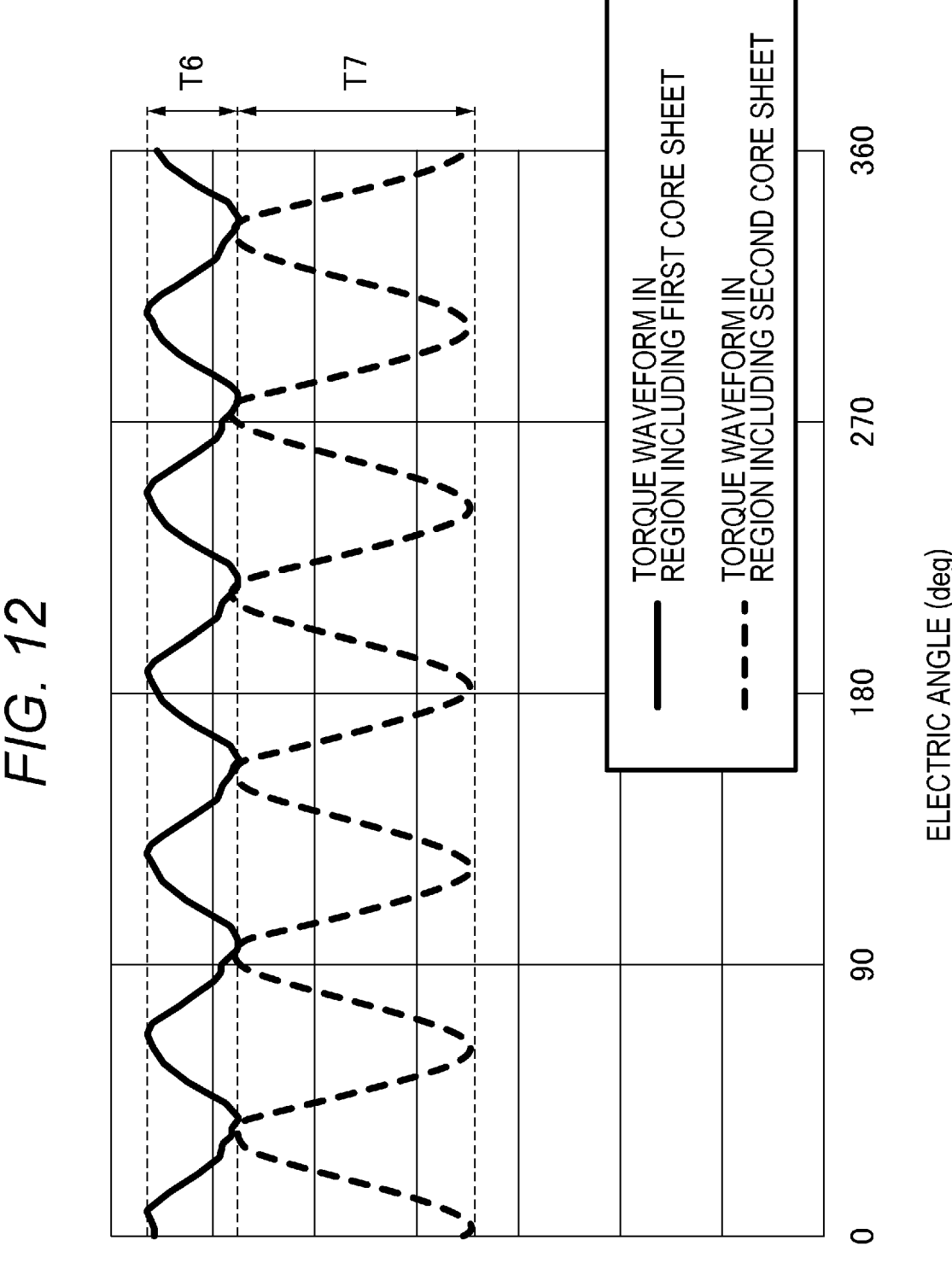
FIG. 12 is a graph illustrating torque characteristics of the motor of FIG. 11.

FIG. 12 is a graph illustrating torque characteristics of the motor of FIG. 11. The horizontal axis indicates the electric angle. The vertical axis indicates torque. A solid-line waveform indicates torque in a region including the first core sheet 200A. A broken-line waveform indicates torque in a region including the second core sheet 200B. In FIG. 12, a reference numeral T6 indicates the magnitude of torque ripple in the region including the first core sheet 200A. A reference numeral T7 indicates the magnitude of torque ripple in the region including the second core sheet 200B.

As illustrated in FIG. 12, the phase of the torque waveform in the region including the first core sheet 200A is opposite to the phase of the torque waveform in the region including the second core sheet 200B. Hence, the two torques are combined as the motor 2000 as a whole. Therefore, the torque ripple T6 and the torque ripple T7 cancel each other out. Hence, the harmonic components of torque ripple are reduced. Therefore, the motor 200 according to the second embodiment is modified in this manner, so that it is possible to further reduce torque ripple while suppressing a decrease in torque in the motor.

Up to this point the modification of the second embodiment has been described. However, the first embodiment can also be modified similarly.

Up to this point the embodiments have been described. However, it is needless to say that the technical scope of the embodiments should not be construed in a limited manner by the above-mentioned detailed description of the embodiments. The above-mentioned embodiments are mere exemplifications. Those skilled in the art understand that the embodiments can be modified in various manners within the scope of the disclosure described in the claims. The technical scope of the embodiments should be determined on the basis of the scope of the disclosure described in the claims and the scope of equivalents thereof.

In the above-mentioned embodiments, a motor is described as an example. However, the embodiments can also be applied to a generator.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A stator comprising:
a stator core configured of blocks divided in a circumferential direction in cross sections including a rotation axis and passing through centers of pole portions each located between two slots having different phases from each other,
wherein
the stator core is evenly divided into six blocks in the circumferential direction, wherein each of the six divided blocks is configured of an inner block and an outer block located outside the inner block,
each of the inner blocks couples a plurality of the pole portions located between two slots having the same phase, and
at least one of the plurality of inner blocks and the plurality of outer blocks is constituted of a soft magnetic material different from the other blocks, and the stator core is evenly divided in the circumferential direction between different phases.

2. The stator according to claim 1, wherein the stator core includes two or more kinds of the soft magnetic materials having different magnetic properties.

3. The stator according to claim 1, wherein the soft magnetic material is a Ni—Fe alloy.

4. The stator according to claim 1, wherein the soft magnetic material is a permalloy.

5. The stator according to claim 2, further comprising:
the plurality of pole portions, wherein
at least one of the plurality of pole portions comprises a soft magnetic material different from the other pole portion.

6. The stator according to claim 5, wherein a relative permeability of the at least one pole portion is lower than a relative permeability of the other pole portion.

7. The stator according to claim 5, wherein the plurality of pole portions has the same shape.

8. The stator according to claim 6, further comprising a yoke portion configured to support the plurality of pole portions, wherein
at least a part of a section from each of the plurality of pole portions to the yoke portion is configured of the soft magnetic material different from other section.

9. The stator according to claim 2, wherein
letting the number of slots of the stator be N, the number of phases be m, and the number of poles be P, a value of the number of slots per pole per phase q obtained by an equation: $q=N/(m \cdot P)$ is equal to or less than one,
the stator further comprises a yoke portion configured to support the plurality of pole portions,
the plurality of pole portions includes a first pole portion provided between windings having the same phase, and
at least a part of a section from the first pole portion to the yoke portion located radially outside the first pole portion comprises a soft magnetic material different from the other section.

10. A motor or generator comprising:
the stator according to claim 1; and
a rotor.

\* \* \* \* \*